United States Patent
Bardouille et al.

(10) Patent No.: US 10,636,087 B1
(45) Date of Patent: Apr. 28, 2020

(54) CUSTOMIZED GRAPHICAL USER INTERFACE FOR MANAGING MULTIPLE USER ACCOUNTS

(71) Applicant: Wells Fargo Bank, N.A., San Francisco, CA (US)

(72) Inventors: Jennifer Dione Bardouille, West St. Paul, MN (US); Sean Christopher Goldrick, Cockeysville, MD (US); Diane Lynn Hoehne, Prior Lake, MN (US); Wiyomi Rustia Quion, Apple Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 77 days.

(21) Appl. No.: 15/452,344

(22) Filed: Mar. 7, 2017

(51) Int. Cl.
*G06Q 40/02* (2012.01)
*G06Q 20/14* (2012.01)
*G06Q 20/10* (2012.01)
*G06Q 10/10* (2012.01)
*G06F 16/955* (2019.01)

(52) U.S. Cl.
CPC ......... *G06Q 40/02* (2013.01); *G06F 16/9558* (2019.01); *G06Q 10/1093* (2013.01); *G06Q 20/108* (2013.01); *G06Q 20/14* (2013.01)

(58) Field of Classification Search
CPC .. G06Q 40/02; G06Q 20/3221; G06Q 40/128; G06Q 20/102; G06Q 20/108; G06Q 20/14; G06Q 40/12
See application file for complete search history.

(56) References Cited

U.S. PATENT DOCUMENTS

| | | | | |
|---|---|---|---|---|
| 5,093,787 A | * | 3/1992 | Simmons | G06Q 20/0425 235/379 |
| 5,649,115 A | * | 7/1997 | Schrader | G06Q 40/02 235/379 |
| 5,918,216 A | * | 6/1999 | Miksovsky | G06Q 20/10 705/35 |
| 6,044,352 A | * | 3/2000 | Deavers | G06Q 40/04 705/1.1 |
| 6,856,970 B1 | * | 2/2005 | Campbell | G06Q 40/00 705/35 |

(Continued)

OTHER PUBLICATIONS

U.S. Appl. No. 15/452,290, filed Mar. 7, 2017, Prediction Engine for Aggregated User Accounts.

(Continued)

*Primary Examiner* — Scott L Jarrett
(74) *Attorney, Agent, or Firm* — Schwegman Lundberg & Woessner, P.A.

(57) ABSTRACT

Among other things, embodiments of the present disclosure can help predict the optimal allocation for effecting payment transactions from, or deposit transactions to, multiple aggregated financial accounts for a user, even across accounts held in different countries or denominated in different currencies. The system may effect transactions automatically according to the identified optimal allocation, as well as providing users with options to handle transactions. Furthermore, embodiments of the present disclosure can enhance a user's visibility into future balances and transactions using a customized graphical calendar that illustrates a user's predicted future balances and transactions.

17 Claims, 5 Drawing Sheets

| February 2017 | | | | | | |
|---|---|---|---|---|---|---|
| SUNDAY | MONDAY | TUESDAY | WEDNESDAY | THURSDAY | FRIDAY | SATURDAY |
| | | | 1<br>Current Balance: $10,000 | 2<br>3 Payment Transactions<br>Predicted Balance: $8,500 | 3 | 4 |
| 5 | 6<br>2 Payment Transactions<br>Predicted Balance: $7,500 | 7 | 8 | 9 | 10<br>1 Payment Transaction<br>Predicted Balance: $6,500 | 11 |
| 12 | 13 | 14 | 15<br>1 Credit Transaction<br>2 Payment Transactions<br>Predicted Balance: $12,000 | 16 | 17 | 18 |
| 19 | 20 | 21 | 22 | 23 | 24 | 25 |
| 26 | 27 | 28<br>1 Credit Transaction<br>5 Payment Transactions<br>Predicted Balance: $11,000 | | | | |

(56) References Cited

U.S. PATENT DOCUMENTS

| | | | |
|---|---|---|---|
| 7,117,172 B1* | 10/2006 | Black | G06Q 40/00 705/35 |
| 7,240,028 B1* | 7/2007 | Rugge | G06Q 40/02 705/30 |
| 7,333,942 B1 | 2/2008 | Cowles | |
| 7,370,011 B2* | 5/2008 | Bennett | G06Q 20/10 705/35 |
| 7,403,917 B1* | 7/2008 | Larsen | G06Q 30/06 705/30 |
| 7,590,595 B2 | 9/2009 | Pessin | |
| 7,689,483 B2 | 3/2010 | Wu et al. | |
| 7,734,543 B2* | 6/2010 | Braco | G06Q 20/04 705/39 |
| 7,873,567 B2 | 1/2011 | Eder | |
| 7,899,750 B1* | 3/2011 | Klieman | G06Q 20/102 705/35 |
| 7,933,834 B2* | 4/2011 | Kumar | G06F 21/41 705/42 |
| 8,024,242 B2 | 9/2011 | Galit | |
| 8,041,633 B2 | 10/2011 | Knowles et al. | |
| 8,082,196 B2* | 12/2011 | Mullan | G06Q 20/04 705/35 |
| 8,121,943 B2 | 2/2012 | Elterich | |
| 8,380,623 B1* | 2/2013 | Ley | G06Q 40/02 705/35 |
| 8,473,858 B2 | 6/2013 | Buchanan et al. | |
| 8,560,447 B1* | 10/2013 | Hinghole | G06Q 40/02 705/35 |
| 8,639,622 B1* | 1/2014 | Moore | G06Q 20/405 705/35 |
| 8,862,507 B2 | 10/2014 | Sandhu et al. | |
| 8,955,741 B2 | 2/2015 | Hansen et al. | |
| 9,117,242 B1* | 8/2015 | Ellis | G06Q 40/00 |
| 2001/0023414 A1 | 9/2001 | Kumar | G06F 21/41 705/35 |
| 2002/0023053 A1 | 2/2002 | Szoc et al. | |
| 2002/0120571 A1* | 8/2002 | Maung | G06O 20/108 705/42 |
| 2003/0208440 A1 | 11/2003 | Harada et al. | |
| 2004/0172359 A1 | 9/2004 | Nakamura | |
| 2004/0177036 A1* | 9/2004 | Nutahara | G06Q 20/10 705/39 |
| 2004/0236647 A1* | 11/2004 | Acharya | G06Q 20/0425 705/30 |
| 2005/0177464 A1 | 8/2005 | Komem et al. | |
| 2006/0175392 A1* | 8/2006 | Schmidt | G06Q 10/109 235/377 |
| 2006/0206425 A1 | 9/2006 | Sharma | |
| 2007/0100749 A1* | 5/2007 | Bachu | G06Q 20/108 705/42 |
| 2007/0262137 A1* | 11/2007 | Brown | G06Q 20/10 235/380 |
| 2008/0006685 A1* | 1/2008 | Rackley, III | G06Q 20/10 235/379 |
| 2008/0010190 A1* | 1/2008 | Rackley, III | G06Q 20/042 705/39 |
| 2008/0027880 A1* | 1/2008 | Yu | A63F 13/10 705/36 R |
| 2008/0033857 A1* | 2/2008 | Moses | G06Q 20/342 705/35 |
| 2010/0100424 A1* | 4/2010 | Buchanan | G06Q 20/10 705/35 |
| 2010/0241547 A1 | 9/2010 | Wolfson et al. | |
| 2010/0280928 A1* | 11/2010 | Dempster | G06Q 20/10 705/30 |
| 2011/0029416 A1* | 2/2011 | Greenspan | G06Q 20/10 705/30 |
| 2011/0087985 A1* | 4/2011 | Buchanan | G06F 3/04847 715/771 |
| 2011/0107265 A1* | 5/2011 | Buchanan | G06Q 30/02 715/835 |
| 2011/0196795 A1* | 8/2011 | Pointer | G06Q 40/02 705/51 |
| 2011/0295731 A1* | 12/2011 | Waldron, III | G06Q 10/0635 705/35 |
| 2012/0078784 A1* | 3/2012 | Anthony | G06Q 20/108 705/42 |
| 2012/0078785 A1* | 3/2012 | Anthony | G06Q 20/108 705/42 |
| 2012/0233073 A1 | 9/2012 | Salmon et al. | |
| 2012/0239541 A1* | 9/2012 | Tsukahara | G06Q 40/02 705/35 |
| 2013/0018738 A1 | 1/2013 | Faires et al. | |
| 2013/0085936 A1* | 4/2013 | Law | G06Q 20/04 705/40 |
| 2013/0132267 A1* | 5/2013 | Moore | G06Q 20/10 705/38 |
| 2013/0185186 A1 | 7/2013 | Blackwood | |
| 2013/0204638 A1* | 8/2013 | Lan | G06Q 50/22 705/2 |
| 2013/0204728 A1 | 8/2013 | Lichterman et al. | |
| 2014/0012745 A1 | 1/2014 | Hanson et al. | |
| 2014/0012746 A1 | 1/2014 | Hanson et al. | |
| 2014/0136381 A1 | 5/2014 | Joseph et al. | |
| 2014/0245419 A1* | 8/2014 | Wolberg-Stok | H04W 12/06 726/9 |
| 2015/0019415 A1* | 1/2015 | Engelman | G06Q 30/04 705/40 |
| 2015/0088712 A1* | 3/2015 | Votaw | G06F 16/583 705/35 |
| 2015/0170112 A1 | 6/2015 | Decastro | |
| 2015/0193749 A1* | 7/2015 | Ivanoff | G06Q 20/14 705/40 |
| 2015/0206252 A1* | 7/2015 | Rephlo | G06Q 40/12 705/30 |
| 2015/0242949 A1 | 8/2015 | Phillips, IV | |
| 2015/0324932 A1* | 11/2015 | McCary, Sr. | G06Q 40/02 705/33 |
| 2015/0339765 A1 | 11/2015 | Dubey et al. | |
| 2016/0086179 A1* | 3/2016 | Barbier | G06Q 20/405 705/44 |
| 2017/0178113 A1 | 6/2017 | Mugford et al. | |
| 2017/0193483 A1* | 7/2017 | Cole | G06Q 20/22 |
| 2017/0323345 A1* | 11/2017 | Flowers | G06Q 30/0269 |
| 2018/0060843 A1 | 3/2018 | Maheshwari | |

OTHER PUBLICATIONS

"Master Accounts: Linking Multiple ClickBank Accounts", ClickBank, [Online]. [Accessed Jun. 21, 2016]. Retrieved from the Internet: <URL: https://support.clickbank.com/entries/22802582-Master-Accounts-Linking-Multiple-ClickBank-Accounts>, 5 pgs.

Shen, Bingqing, et al., "Linear System Solvability in the Virtual Money Exchange Rate Algorithm", Enterprise Systems Conference (ES), 2014, Shanghai, 2014, pp. 142-148, (2014), 7 pgs.

Smith, John A., et al., "Fluctuating currency budget management", AACE International Transactions 1994 (1994): RM2-1, (Jun. 1994), 8 pgs.

Wang, Xiaoming, et al., "Case based reasoning approach for transaction outcomes prediction on currency markets", Soft Computing Applications, 2009. SOFA '09. 3rd International Workshop on, Arad, 2009, pp. 93-98, (2009), 8 pgs.

"U.S. Appl. No. 15/452,290, Non Final Office Action dated Sep. 11, 2019", 39 pgs.

"U.S. Appl. No. 15/452,290, Response filed Dec. 11, 2019 to Non Final Office Action dated Sep. 11, 2019", 16 pgs.

\* cited by examiner

February 2017

| SUNDAY | MONDAY | TUESDAY | WEDNESDAY | THURSDAY | FRIDAY | SATURDAY |
|---|---|---|---|---|---|---|
| | | | 1<br>Current Balance: $10,000 | 2<br>3 Payment Transactions<br>Predicted Balance: $8,500 | 3 | 4 |
| 5 | 6<br>2 Payment Transactions<br>Predicted Balance: $7,500 | 7 | 8 | 9 | 10<br>1 Payment Transaction<br>Predicted Balance: $6,500 | 11 |
| 12 | 13 | 14 | 15<br>1 Credit Transaction<br>2 Payment Transactions<br>Predicted Balance: $12,000 | 16 | 17 | 18 |
| 19 | 20 | 21 | 22 | 23 | 24 | 25 |
| 26 | 27 | 28<br>1 Credit Transaction<br>5 Payment Transactions<br>Predicted Balance: $11,000 | | | | |

CUSTOMIZED GRAPHICAL USER INTERFACE FOR MANAGING MULTIPLE USER ACCOUNTS

BACKGROUND

Increasingly, many users (e.g., individuals as well as companies and other organizations) have multiple financial accounts (e.g., checking accounts, savings accounts, credit card accounts, investment accounts, etc.) potentially hosted by multiple different financial institutions or other entities. Moreover, many such individuals may hold accounts hosted in different parts of the world denominated in different currencies. While these multiple accounts may provide a user with various advantages, such as access to different financial products and the like, effecting payment transactions using funds from such accounts, and effecting deposit transactions to deposit funds into such accounts, can provide a number of challenges. Embodiments of the present disclosure address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help predict the optimal allocation for effecting payment transactions from, or deposit transactions to, multiple aggregated financial accounts for a user, even across accounts held in different countries or denominated in different currencies. The system may effect transactions automatically according to the identified optimal allocation, as well as providing users with options to handle transactions. Furthermore, embodiments of the present disclosure can enhance a user's visibility into future balances and transactions using a customized graphical calendar that illustrates a user's predicted future balances and transactions.

Figure 1:
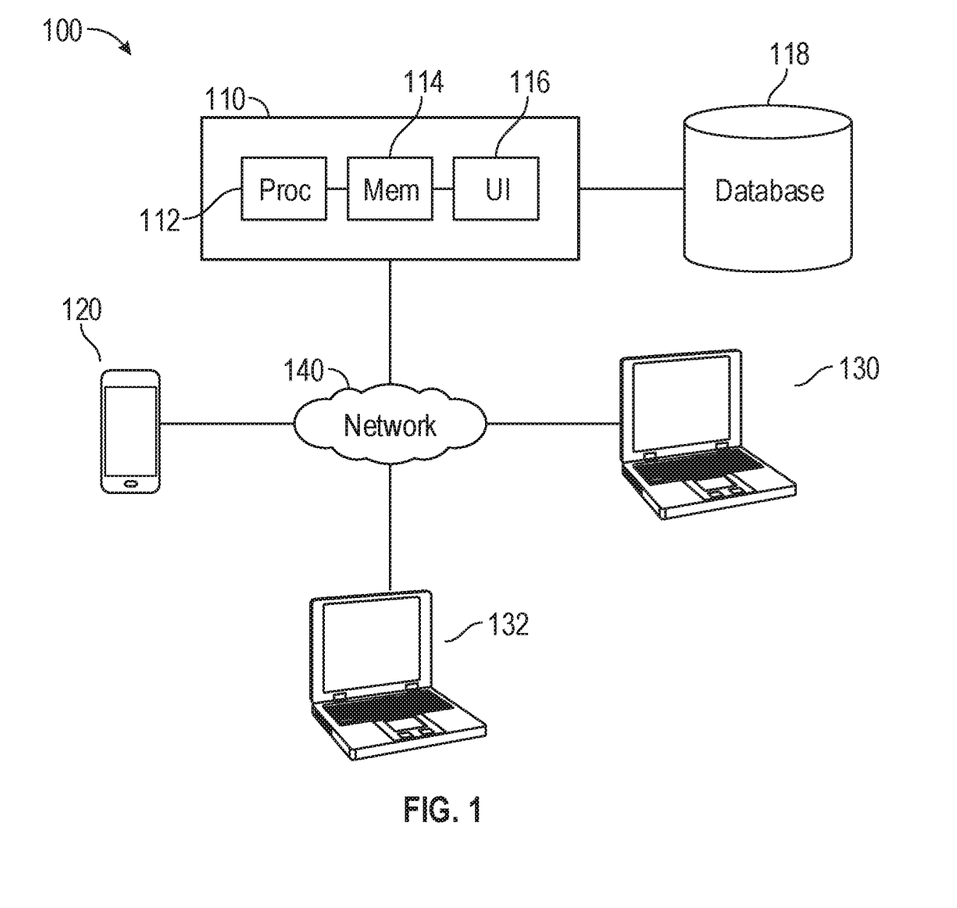
FIG. 1 illustrates a block diagram of an exemplary system according to various aspects of the disclosure.

FIG. 1 is a block diagram of system which may be used in conjunction with various embodiments. While FIG. 1 illustrates various components of a computer system, it is not intended to represent any particular architecture or manner of interconnecting the components. Other systems that have fewer or more components may also be used.

In FIG. 1, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 122, 130.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provides the user with data, notifications, and other information. Typical I/O devices may include mice, keyboards, modems, network interfaces, printers, scanners, video cameras and other devices.

The system 110 may communicate with one or more client computing devices 120, 122, 130 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device. In one exemplary embodiment, described in more detail below, client computing device 120 is operated by a first service provider, client computing device 122 is operated by a second service provider, and client computing device 130 is operated by a customer seeking a service provided by one or both the first service provider and the second service provider. Embodiments of the present disclosure may operate in conjunction with any number of different customer and/or provider computing devices.

The network 140 may include any electronic communications system or method. Communication among components operating in conjunction with embodiments of the present disclosure may be performed using any suitable communication method, such as, for example, a telephone network, an extranet, an intranet, the Internet, online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as any number of other existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
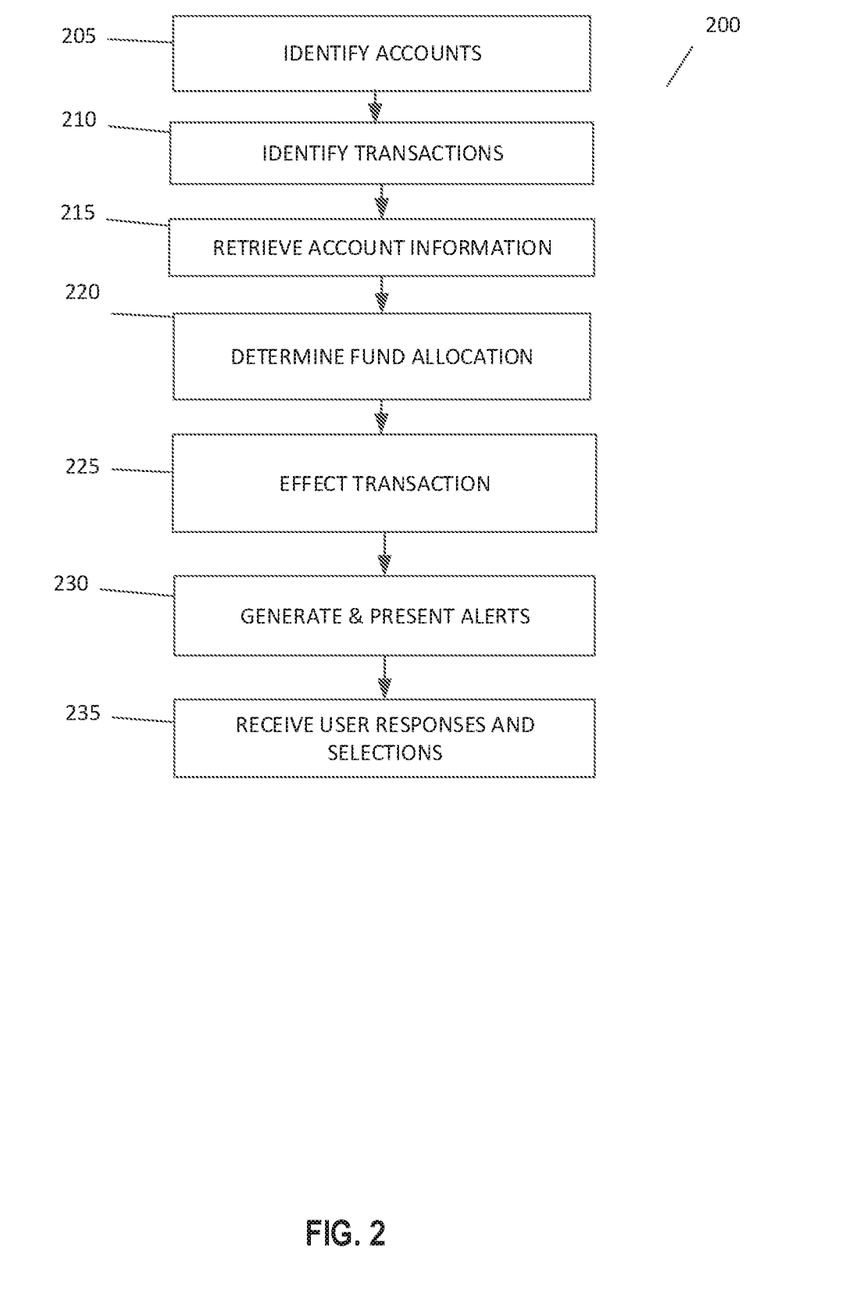
FIG. 2 is a flow diagram of an exemplary process according to various aspects of the disclosure.
Figure 3:
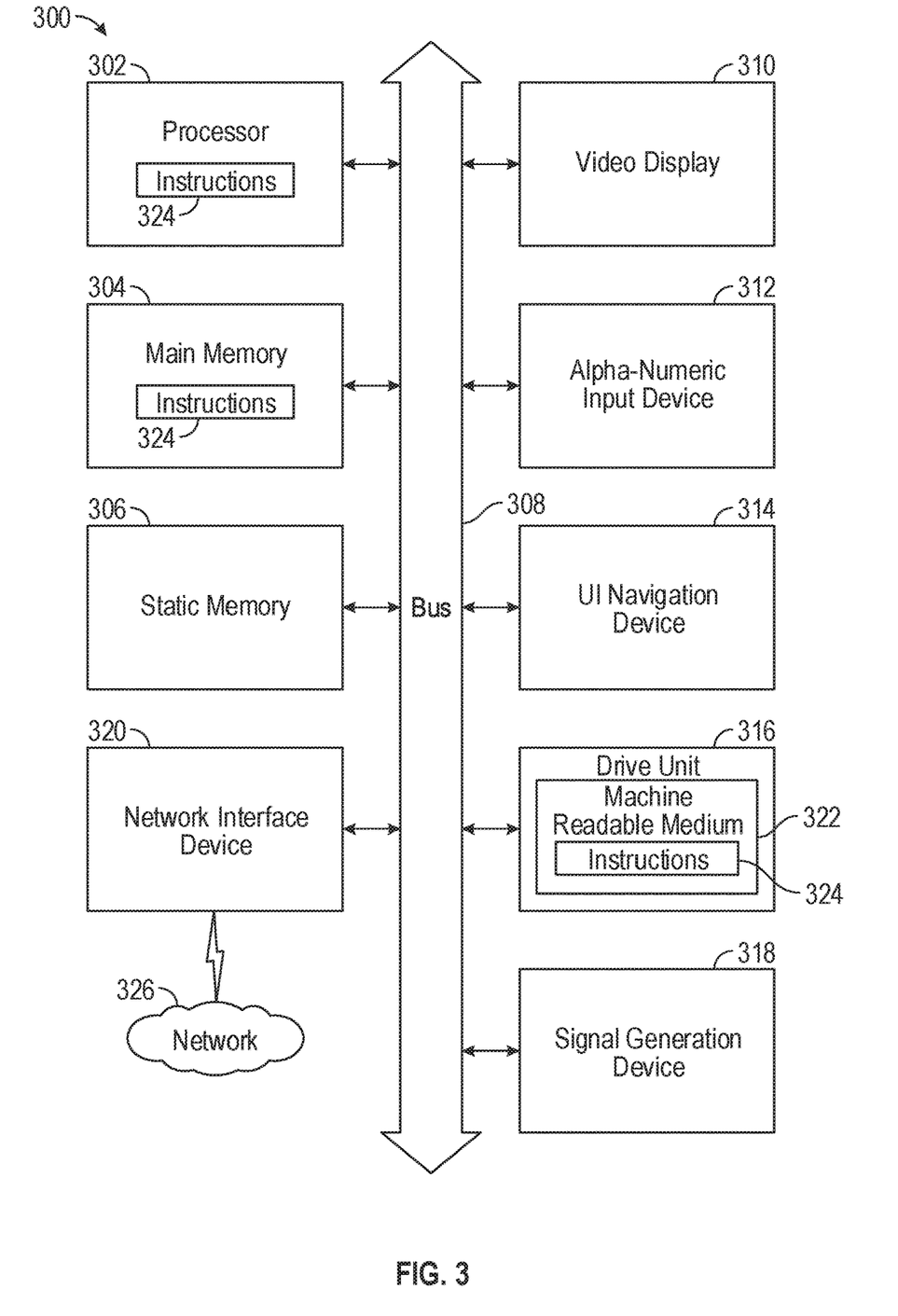
FIG. 3 is a block diagram of an exemplary machine according to various aspects of the disclosure.

FIG. 2 depicts an exemplary process according to various aspects of the present disclosure. In this example, method 200 includes identifying one or more financial accounts of a user (205), identifying one or more transactions involving the user (210), retrieving information regarding the financial accounts (215), determining an optimal allocation of funds for the transaction among the user's accounts (220), effecting the transaction (225), generating and presenting alerts (230), and receiving user responses and selections (235). The steps of method 200 may be performed in whole or in part, may be performed in conjunction with some or all of the steps in other methods, and may be performed by any number of different systems, such as the systems described in FIGS. 1 and/or 3.

Embodiments of the present disclosure may be used to provide a user with visibility and guidance for transactions and balances across multiple accounts held by the user. For example, in the system 100 shown in FIG. 1, a server computer system 110 communicates (over network 140, such as the Internet) with the computing device of a user 120 (users may also be referred to herein as "customers"). The computer system 110 also communicates with the computing device of a first entity (e.g., a financial institution hosting a first account of the user) 130 and a computing device of a second entity (e.g., a financial institution hosting a second account of the user) 132. Entities hosting an account of a user may also be referred to herein as "service providers," or "financial institutions." The customer and/or entities hosting the user's financial accounts may be or include any number of different individuals, organizations, systems, devices, and the like. While three computing devices are shown in the exemplary system in FIG. 1, embodiments of the present disclosure may also operate in conjunction with any number of different customer and/or service provider computer systems. Additionally, the steps of method 200 may be performed (in whole or in part) by one or more software components operating on the computer system 110 as well as other computing devices operating in conjunction with embodiments of the present disclosure. For example, some or all of the steps in FIG. 2 may be performed by a prediction engine software component operating on computer system 110.

In the exemplary method 200 shown in FIG. 2, the system (e.g., server computer system 110 in FIG. 1 running a software prediction engine component) identifies one or more accounts of a user (205). For example, the system 110 may access information (e.g., over a secure encrypted connection via network 140) regarding a first financial account for the user hosted by a first computing device 130 of a first entity, and information regarding a second financial account for the user hosted by a second computing device 132 of a second entity. Such information may be retrieved using respective application programming interfaces (APIs) exposed by the first and second host computing devices 130, 132.

The system identifies one or more transactions involving the user (210), such as a payment transaction in which the user is the payer (i.e., the party paying another party) or the payee (i.e., the party receiving payment). The system may also identify deposit transactions where an account of the user is receiving funds from another source or the user is depositing funds into the account of another party. The transactions identified by the system may be associated with one or more of the user's financial accounts (e.g., the accounts identified in step 205) or the transaction may be unaffiliated with any particular account. For example, the system may identify a payment transaction where the user is purchasing office supplies for his or her business.

The system may retrieve (215) information regarding the accounts of a user, the transactions a user is involved in, and other information. For example, a variety of information about the user may be received, such as the user's name, address, demographic information, a user's history of transactions, the type and/or value of assets in each of the user's accounts, and other information. Information regarding the user's accounts may include, for example, the current balance of an account, the type of currency in which the account is denominated (e.g., U.S. Dollars, British Pounds, etc.) and information on past and future transactions involving the account, such as the amounts of payment transactions from, and deposit transactions to, the account and the dates on which such transactions are scheduled to occur.

The information retrieved by the system may come from a variety of sources. In some embodiments, user information is received from a database in communication with the system (e.g., from the memory 114 or database 118 in communication with the server computer system 110 in FIG. 1). In other embodiments, the system may request account information via an Application Program Interface (API) exposed by a computing device hosting the account of the user. Information may also be received by the system 110 via selections and entries made by the user (e.g., via a web page or application operating on the user's computing device 120). In some embodiments, the system may be controlled by a financial institution or other entity with whom the user/customer has a financial account. In such cases, the system can request authorization from the customer to retrieve information regarding the customer. The customer can pre-authorize such retrieval or authorize the retrieval on a case-by-case basis. The system may further retrieve information using Enterprise Resource Planning (ERP) plug-ins or API calls to have an ERP system directly integrate with available business information.

The system can analyze information regarding the user, the user's accounts, and/or the transaction involving the user to determine an optimal allocation (or multiple possible "optimal" allocations) of funds for the transaction among the user's accounts. Where there are multiple optimal allocations (e.g., each allocation or course of action having different strengths and weaknesses) the system may automatically pick an allocation based on prior selections by the user, an analysis of past transactions, predicted transactions, and/or selections from the user (e.g., via an alert as described below).

The embodiments of the present disclosure may predict (e.g., via a software prediction engine) future balances, transactions, and other events associated with the accounts of a user based on information regarding pre-scheduled transactions, input from the user identifying such events, and based on historical data from the user's accounts. For example, the system may identify that a particular payment transaction from a user's account occurs on the same date of every month to the same payee and for the same (or similar) amount, and thus predict (with a particular level of accuracy) that a like transaction will occur the following month. Likewise, the system may identify a payroll deposit for the same (or similar) amount on a periodic basis for the user and predict a like deposit transaction the following month following the same periodic history as previous transactions.

Embodiments of the present disclosure can analyze possible results of handling transactions in different ways to determine the best option(s) for effecting a transaction. For example, the system may analyze the benefits of paying down principle on a loan, paying a debt early to obtain a discount, paying a debt later to avoid withdrawing funds that will draw a penalty, handing a transaction in a manner to minimize a tax payment, and other factors. The system may likewise facilitate/effect transactions using accounts hosted by different entities and in different countries by analyzing foreign and domestic holidays, expected times to complete transactions using different payment systems, and other information.

For example, a customer may have multiple accounts hosted by multiple service providers. The system may retrieve information on the scheduled inflows (e.g., deposits) and outflows (e.g. payments) for each account and utilize a prediction engine to predict the occurrence of transactions and balances on various dates within a predetermined time period (e.g., 3 days, 1 week, 1 month, etc.). The system may also determine the optimal allocation of funds analyze costs and fees associated with withdrawing, depositing, or transferring funds involving a first account denominated in a first type of currency (e.g., U.S. dollars) and a second account denominated in a second type of currency (e.g., British Pounds). The system may, for example, analyze currency exchange rates, transaction fees, taxes, and other costs when analyzing accounts held in different countries and/or denominated in different currencies.

In another example, the system may identify one or more transactions involving the user's accounts scheduled in the future that involve withdrawing funds from, or depositing funds to, one or more of the user's accounts. In a specific example, consider a case where the user has a first account with a current balance of $500, a second account with a balance of $300, and a payment transaction of $400 (where the user is the payer) due in three days. The system may analyze information from the user's accounts and determine that a deposit transaction is scheduled to deposit $400 into the second account in two days, and a payment transaction is scheduled to withdraw $200 from the first account in two days. Accordingly, the system may automatically choose to schedule the $400 payment transaction to be effected on its due date in three days, when the second account will have a predicted balance of $700, but the first account will only have a predicted balance of $100.

In some embodiments, the system may determine probabilities for different predicted transactions and balances reflecting a probability that that a transaction or balance is accurate (e.g., a confidence level). For example, the system may predict (on the first day of the month) that a deposit/credit transaction will occur to deposit funds into a user's account on the fifteenth of the month based on a long history of credit transactions occurring on the fifteenth of the month from the user's employer (e.g., payroll deposits) and may assign a relatively high likelihood of the deposit transaction occurring (e.g., 99% based on the deposit occurring on the fifteenth for 50 straight months without errors in the transaction).

By contrast, the system may predict (on the first of the month) that an account of a user will have a $10,000 balance on the fourth of the month based on an expected rental income deposit of $3000 by the user. In this case, however, the system may assign only a 40% likelihood of the balance being accurate due to factors such as: the user must manually deposit a check from a tenant, the deposit of the rental income by the user varies between the second of each month to the tenth of each month, the tenant's account had insufficient funds twice in the last year, and other factors detracting from the certainty of the deposit occurring by the particular date.

The system may thus determine a current balance for each of a user's multiple accounts prior to a transaction that withdraws funds from, or deposits funds to, the user's accounts, as well as predicted balances for the user's accounts after such a transaction. The system may further determine respective probabilities for each predicted balance reflecting the level of accuracy for each predicted balance. The system may likewise determine probabilities reflecting the likelihood of a transaction occurring (at all, by a particular date, etc.). These probabilities may be displayed in conjunction with alerts to the user (e.g., via the financial calendar discussed below) to allow users to quickly gauge whether they can reasonably rely on a particular balance, whether a transaction will occur on or by a particular date, and the like.

Factors used to determine the probability reflecting the level of accuracy with a predicted transaction, balance, or other event by the system may be weighted differently from each other. With the previous example, for instance, the tenant's insufficient funds could be weighted at 0.2 to reflect that it is an infrequent occurrence, while the variability of the user's deposits could be weighted at 1.4 based on there being little or no specific pattern to the user's deposits.

Probabilities reflecting levels of accuracy for transactions, balances, and other events associated with the accounts of a user can be determined based on any desired criteria, such as an expected time to complete a transaction, a liquidity restriction associated with a user's account, and other information and criteria.

The system may analyze the balances in multiple accounts to determine the optimal allocation of funds to or from each account, as well as to seek to withdraw funds from, or deposit funds to, other accounts. For example, for a payment transaction where the user is a payer, the system may determine a first balance of a first account of the user and a second balance of a second account of the user, and determine that the sum of the first balance and the second balance is insufficient to effect the payment transaction. In response to identifying the shortfall, the system may access a line of credit associated with the user to provide the needed funds to effect the transaction, and/or to withdraw funds from one or more other accounts.

Similarly, in another example, the system may determine the sum of the first balance and the second balance is insufficient to effect the payment transaction and identify an investment product held by the user, along with determining a cost to withdraw funds from the investment product to effect the payment transaction. Based on the determined cost to withdraw funds from the investment product, the system may generate an alert containing a recommendation to withdraw funds from the investment product and cause the alert to display on the display screen of a computing device of the user. The user in turn may (e.g., via selections made to the alert via the user's computing device) provide a response to the system that causes the system to (for example) either: (1) withdraw funds from the investment product to effect payment of the transaction or (2) delay effecting the transaction for a predetermined period of time.

In a further example, consider a payment transaction where the user is the payer. The system may determine, based on the current balances of four of the user's accounts (A1, A2, A3, and A4) that account A1 can commit 25%, A2 can commit 0%, A3 can commit 55%, and A4 can commit the remainder (20%) to satisfy the payment. The system may automatically effect the payment by withdrawing the funds from the accounts in the determined percentages and providing a unified payment tool that can be exposed to other systems (e.g., computing devices 130, 132, etc. of entities hosting the user's accounts) through the API. In this manner, the system can quickly and automatically perform transactions for a user/customer without requiring the customer to perform complex manipulation of his/her accounts, the customer simply observes the completion of the transaction (e.g., provided through an alert such as the financial transactions calendar described below).

The system may effect (e.g., achieve, complete, satisfy) some or a portion of the transaction (225). For example, the system may effect a payment transaction in which the user is the payer by withdrawing sufficient funds from one or more of the user's accounts (e.g., based on the determined optimal allocation from step 220) and electronically transferring the funds to the payee.

The system may effect a transaction (225) based on a variety of factors and criteria. In some embodiments, the user may select or enter the criteria upon which to effect transactions. Additionally or alternatively, the system may automatically effect a transaction based on preprogrammed criteria and/or criteria identified as pertinent for a particular transaction. For example, in a case where the system can withdraw funds from a first account of the user and/or a second account of a user to effect a payment transaction, the system may determine the respective costs of withdrawing funds from the first account and the second account. Based on the relative costs, the system may then withdraw funds from the first account, the second account, or both such as to minimize the total costs to effect payment of the payment transaction. In a specific example, consider a payment transaction of $1000 where the user is the payer, and where the user has $500 in a first account and $1100 in a second account. The system may determine (e.g., from the information retrieved for each account via the respective APIs for each system hosting the account) that both accounts impose a $20 low-balance fee if their balances fall below $100. Accordingly, the system could withdraw $200 from the first account and $800 from the second account to satisfy the $1000 payment transaction, and leaving each account with the same balance ($300 each), both above the $100 threshold for the low balance fee and thus avoiding the fees altogether.

The system may generate and present various alerts (230) in various formats containing a variety of information. In some embodiments, for example, the system may identify one or more potential issues associated with a transaction, such as insufficient funds in the user's accounts to satisfy a payment transaction. In such cases, the system may generate an alert regarding the insufficient funds, and present the alert on the display screen of the user's computing device (e.g., device 120 in FIG. 1) describing the issue and presenting one or more selectable options for the user to resolve the issue, such as to delay the payment transaction, transfer funds from another account, or other solutions. The user may likewise be presented the systems determined optimal allocation of funds for a transaction to accept or decline, as well as multiple options for allocating funds for a transaction or taking other actions associated with various transactions and/or the user's accounts.

The system may transmit the alert to various entities depending on the nature of the issue identified. For example, in a case where the interactions of a user with the system indicate an error (such as a dead link on the system's website or other failure) the system may transmit the alert to an administrator of the system to correct the error.

In some exemplary embodiments, the system may customize the information provided to in an alert based on information regarding the transaction as well as the parties to a transaction. For example, the system may customize information in an alert displayed to a business user where a merchant involved in a transaction with the business is also one of the business' customers, and the system can identify the transaction terms used in previous transactions with the merchant, including preferred payment terms, and preferred payment types. Information regarding accounts or purchase information may likewise be included in the alert.

The system may create and display various user interface components within an alert, and supplement views of financial institution information and recommendations with a variety of business information. Additionally, the system may create and transmit standardized messages (e.g., in XML, SWIFT, ISO, or other industry standard message formats) from, or in conjunction with, the alerts.

Figure 4:
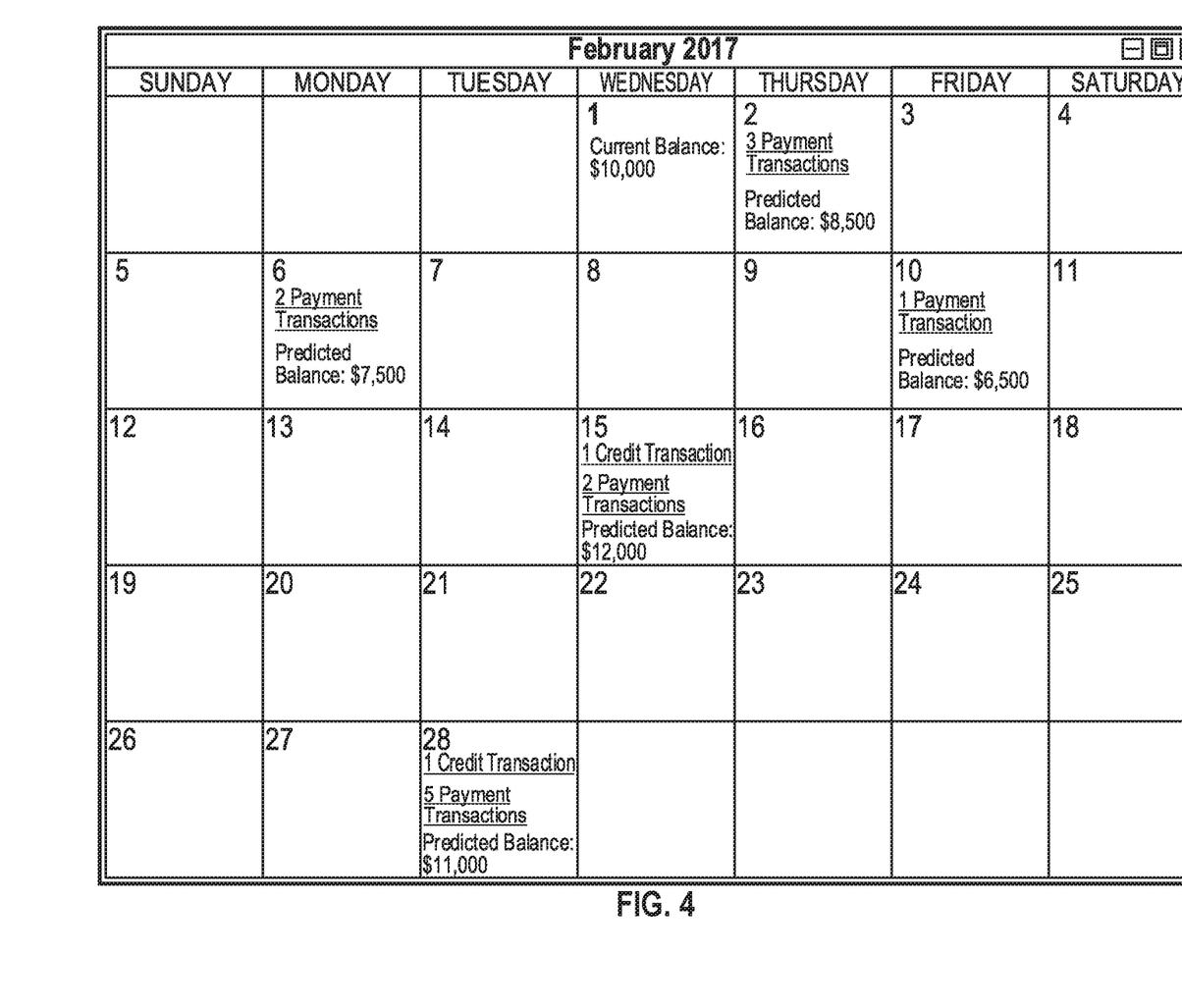
FIGS. 4 and 5 are exemplary screenshots according to various aspects of the disclosure.

In some exemplary embodiments, the alert generated and presented (230) to the user may include a graphical calendar that depicts dates within a predetermined time period (e.g., one week, one month, etc.) and depicts the transactions involving the user or the user's accounts in association with the respective dates on the calendar on which the transactions are scheduled to occur. For example, referring now to FIG. 4, an exemplary graphical financial calendar is displayed that indicates the current date (the first, via boldface font) and dates for the remainder of a time period (i.e., the month of February). The current balance for the current day (i.e., February 1) is displayed along with predicted balances for various days in the month. Within the graphical calendar, transactions involving the user and/or the user's accounts are depicted in association with their respective dates. While balances and transactions are displayed for only some of the days in the calendar, there could be balances and transactions for displayed every day. Furthermore, while a monthly calendar is shown, embodiments of the present disclosure may display a calendar for any desired time period (e.g., a 6-month calendar, an 8-hour calendar for a particular day, etc.).

As described above, the system may determine the current balance for an account based on information for the account (e.g., retrieved via an API exposed by a computing hosting the account) and generate a predicted balance for various dates within the predetermined time period based on scheduled or predicted transactions during the time period. Also as described above, the system may determine a probability reflecting the accuracy level of transactions, balances, and other events associated with an account. In cases where a user has multiple accounts, the current balance and predicted balances may be based on the sum of the balances from the multiple accounts. Balances may also be displayed individually for each account.

For example, a plurality of accounts associated with the user might include a first account hosted by a computing device of a first entity and a second account hosted by a computing device of a second entity. The system identifies transactions associated with the accounts by retrieving information regarding the first account over the Internet from the first computing device via an application programming interface hosted by the first computing device, and retrieving information regarding the second account over the Internet from the second computing device via an application programming interface hosted by the second computing device.

Figure 5:
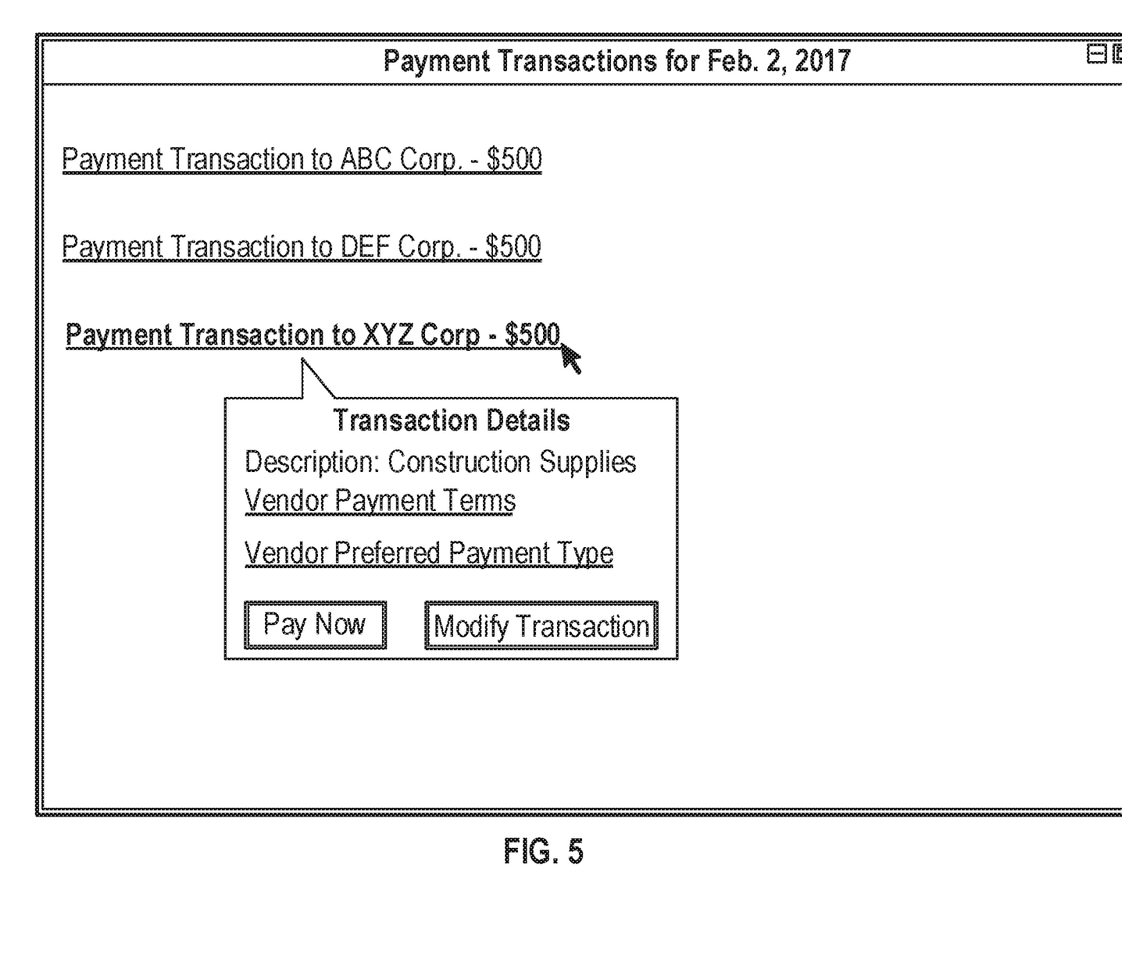

Embodiments of the present disclosure may display information within the graphical calendar as selectable buttons, links, or other user interface components. For example, the exemplary calendar depicted in FIG. 4 displays the total number of transactions for each date as a selectable link. In response to a receiving a user selection information on the calendar (such as the transactions links) over the Internet or other network, the system may present additional information related to the selection. For example, FIG. 5 depicts an exemplary screen where a user has selected the "3 Payment Transactions" link on February 2 of the calendar in FIG. 4. In this example, the list of the three transactions are presented (also as selectable links) that display the amount of each transaction, the type of transaction, and the other party involved in the transaction.

In this example, the user may select the link corresponding to a transaction in the list of transactions to display additional details associated with the transaction. Specifically, the user has selected the third transaction in FIG. 5, which the system receives over the Internet and, in response, presents details associated with the selected transaction on the display screen of the user's computing device. In FIG. 5, the system displays a description of the goods purchased ("Construction Supplies") along with selectable links to display the vendor's payment terms and the vendor's preferred payment type.

The system may also display options for effecting the transaction in conjunction with the calendar. In FIG. 5, for example, the dropdown menu displayed when the user selected the third transaction offers a "pay now" button (to allow the user to initiate the transaction now) and a "modify transaction" button to allow the user to change various aspects of the transaction, such as the date when the payment is made, the type of accounts (e.g., credit card, checking account, savings account, etc.) used to effect the payment transaction, and other aspects of the transaction.

The system may receive (235) responses, selections, and other input from the user (e.g., via the user's computing device 120 in FIG. 1). In some embodiments, the user may provide responses, selections, and other input in response to alerts that are generate and displayed (230) for the user. For example, the system may generate an alert comprising information on one or more determined optimal allocations of funds for a transaction involving the user and cause the alert to display on the screen of the user's computing device. The user may provide a response to the alert (e.g., via a link, button, or other user interface component in the alert) accepting or declining a particular option for allocating funds or otherwise effecting a transaction. In a specific example, consider a payment transaction where the user is the payer but has insufficient funds to cover the full amount of the transaction. The system may generate an alert providing the user with the option to: (1) access a line of credit associated with the user to provide the needed funds to effect the transaction, (2) delay effecting the transaction for a predetermined time period (e.g., 1 week) to allow deposit transactions scheduled for the user's accounts to increase the user's available funds, or (3) to make a partial payment of the transaction and to finance the remainder of the balance with the payee (e.g., until the following month). The options may be presented to the user, for example, via selectable buttons or links to allow the user to control the system to perform one of the options with a single selection.

In addition to providing options for processing/handling transactions in an alert, the system may provide guidance to a user providing a recommendation of a course of action to handle a particular transaction. In this manner, the system improves upon conventional payment processing systems by helping users quickly select options in their best financial interest without requiring that the user independently analyze all the possible factors and options for effecting a transaction. For example, the system may provide an alert recommending that a user apportion a deposit transaction to between a first account paying a relatively higher interest rate and a second account paying a relatively lower interest rate such that the user's expected payment transactions over a predetermined time period (e.g., the remainder of the current month) can be met using funds from the second account while maximizing the funds in the first account to provide the user with the best possible interest return on his/her money.

In another example where the user is a payer for a payment transaction and has two accounts (a first account and a second account) and a line of credit to draw from, the system may analyze the cost of capital associated with the first account and/or the second account (e.g., the rate of return that could be earned if funds are left in the respective accounts as opposed to being used to satisfy the payment transaction). The system may further analyze the cost to access the line of credit to provide funds to satisfy the transaction and, based on the analysis of the accounts and line of credit, generate a recommendation within an alert that the user satisfy the transaction using some combination of the funds from the accounts and/or the line of credit or delay effecting the transaction for a predetermined period of time (e.g., until the next month).

Accordingly, embodiments of the present disclosure can provide users with a clear, easy-to-understand and access view of their accounts, along with predicted future transactions and balances (along with accuracy levels if desired). Among other things, this allows users to see an aggregated view of their multiple accounts in one display, even when the accounts are hosted by different financial institutions or other entities. Furthermore, the system may provide a sum of balances across a user's accounts even when the accounts are held in different currencies. Moreover, the system may utilize the disparate accounts of a user to automatically (or with user input) effect transactions to withdraw funds from, or deposit funds into the various accounts. Furthermore, embodiments of the present disclosure may retrieve information regarding a user's accounts (e.g., via APIs) in real-time or near-real-time to provide users with current, accurate representations of their accounts.

FIG. 3 is a block diagram illustrating exemplary components of a computing system 300 that may operate in conjunction with embodiments of the present disclosure. System 300 (in whole or in part) may be (or include) any of the computing devices 110, 120, 130, 132 shown in FIG. 1. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including"

and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A computing system for providing an interface between account information and a user having a plurality of accounts, the system comprising:
   a processor; and
   memory coupled to the processor and storing instructions that, when executed by the processor, cause the system to perform operations comprising:
      identifying one or more transactions associated with at least one of the plurality of accounts of a user, the one or more transactions scheduled during a predetermined time period at least partially in the future relative to the identifying;
      generating a graphical user interface, the user interface comprising a graphical calendar, the graphical calendar comprising a plurality of date fields corresponding respective dates within the predetermined time period, wherein each of the respective one or more transactions are depicted in association with their respective dates in the calendar as respective selectable links, wherein each respective selectable link indicates a total number of transactions on the respective date;
      presenting the graphical user interface on a display screen of a computing device of the user in communication with the system over a communications network;
      receiving, from the computing device of the user, a selection of a first selectable link of the respective selectable links, the first selectable link associated with a first date in the predetermined time period;
      responsive to receiving the selection of the first selectable link, modifying the graphical user interface to include a list of one or more transactions, the list comprising a first transaction scheduled for the first date on the display screen of the computing device of the user; and
      providing, via the graphical user interface, an alert indicating that there are insufficient funds in the plurality of accounts of the first transaction, wherein the alert indicates a suggested allocation of the first transaction between a first account of the plurality of accounts and a second account of the plurality of accounts, and wherein the alert comprises a user interface component selectable by the user to accept the suggested allocation.

2. The system of claim 1, wherein the graphical calendar includes a current date and one or more future dates within the predetermined time period.

3. The system of claim 1, wherein generating the graphical calendar includes determining a current balance of the plurality of accounts of the user for a current date, and generating a predicted balance of the plurality of accounts of the user for a future date.

4. The system of claim 3, wherein generating the predicted balance includes determining a probability reflecting an accuracy level of the predicted balance.

5. The system of claim 4, wherein determining the probability reflecting an accuracy level of the predicted balance is based on an expected period of time to complete a transaction from the one or more transactions.

6. The system of claim 4, wherein determining the probability reflecting an accuracy level of the predicted balance is based on a liquidity restriction associated with an account from the plurality of accounts of the user.

7. The system of claim 3, wherein the current balance and the predicted balance are based on a sum of balances from the plurality of accounts of the user.

8. The system of claim 7, wherein the plurality of accounts of the user include a first account hosted by a first computing device of a first entity and a second account hosted by a second computing device of a second entity, and wherein identifying the one or more transactions includes retrieving information regarding the first account over the communications network from the first computing device via an application programming interface hosted by the first computing device, and retrieving information regarding the second account over the communications network from the second computing device via an application programming interface hosted by the second computing device.

9. The system of claim 1, wherein the list of the one or more transactions comprises a respective selectable link for each of the respective transactions in the one or more transactions for the respective date, and wherein the memory further stores instructions for causing the system to perform operations comprising:
   receiving, from the computing device of the user over the communications network, a selection of a selectable link associated a second transaction in the list of transactions; and
   in response to receiving the selection of the selectable link, presenting details associated with the second transaction on the display screen of the computing device of the user.

10. The system of claim 1, wherein the one or more transactions comprises a payment transaction from the user, and wherein the memory further stores instructions for causing the system to perform operations comprising:
   effecting payment of the payment transaction by withdrawing funds from the plurality of accounts.

11. The system of claim 10, wherein effecting payment of the payment transaction includes:
   determining a cost of withdrawing funds from a first account of the user and a cost of withdrawing funds from a second account of the user; and
   withdrawing funds from one or more of the first account and the second account based on the determined costs of withdrawing the funds to minimize total costs to effect payment of the payment transaction.

12. The system of claim 10, wherein effecting payment of the payment transaction includes:
   retrieving information regarding a first account of the user via an application programming interface over the communications network from a first computing device hosting the first account;
   retrieving information regarding a second account of the user via an application programming interface over the communications network from a second computing device hosting the first account; and
   determining an optimal allocation of funds for the payment transaction between the first account and the second account based on the retrieved information for the first account, the retrieved information for the second account, and the payment transaction.

13. The system of claim 1, wherein the one or more transactions comprises a deposit transaction to the user, and wherein the memory further stores instructions for causing the system to perform operations comprising:

effecting the deposit transaction by depositing funds to one or more of a first accounts of the plurality of accounts and a second account of the plurality of accounts, wherein effecting the deposit transaction includes determining an optimal allocation of funds for the deposit transaction between the first account and the second account by identifying one or more deposit transactions scheduled in the future and that involve depositing funds into one or more of the first account and the second account.

14. The system of claim 13, wherein determining the optimal allocation of funds for the payment transaction between the first account and the second account includes determining a respective probability for each of the one or more deposit transactions reflecting a likelihood that the respective deposit transaction will occur on a particular date.

15. The system of claim 13, wherein determining the optimal allocation of funds for the payment transaction between the first account and the second account includes determining a current balance for each of the first account and the second account and a predicted balance for each of the first account and the second account after depositing of the funds into one or more of the first account and the second account.

16. A computer-implemented method for providing an interface between account information and a user having a plurality of accounts, the method comprising:

identifying, by a computer system, one or more transactions associated with a plurality of accounts of a user, the one or more transactions scheduled during a predetermined time period at least partially in the future relative to the identifying;

generating, by the computer system, a graphical user interface, the user interface comprising a graphical calendar, the graphical calendar comprising a plurality of date fields corresponding to respective dates within the predetermined time period, wherein each of the respective one or more transactions are depicted in association with their respective dates in the calendar as respective selectable links, wherein each respective selectable link indicates a total number of transactions on the respective date;

presenting, by the computer system, the graphical user interface on a display screen of a computing device of the user in communication with the system over a communications network;

receiving, from the computing device of the user, a selection of a first selectable link of the respective selectable links, the first selectable link associated with a first date in the predetermined time period;

responsive to receiving the selection of the first selectable link, modifying the graphical user interface to include a list of transactions, the list comprising a first transaction scheduled for the first date on the display screen of the computing device of the user; and providing, via the graphical user interface, an alert indicating that there are insufficient funds in the plurality of accounts of the first transaction, wherein the alert indicates a suggested allocation of the first transaction between a first account of the plurality of accounts and a second account of the plurality of accounts, and wherein the alert comprises a user interface component selectable by the user to accept the suggested allocation.

17. A non-transitory computer-readable medium storing instructions that, when executed by a computer system, cause the computer system to perform operations comprising:

identifying one or more transactions associated with at least one of a plurality of accounts of a user, the one or more transactions scheduled during a predetermined time period at least partially in the future relative to the identifying;

generating a graphical user interface, the user interface comprising a graphical calendar, the graphical calendar comprising a plurality of date fields corresponding to respective dates within the predetermined time period, wherein each of the respective one or more transactions are depicted in association with their respective dates in the calendar as respective selectable links, wherein each respective selectable link indicates a total number of transactions on the respective date;

presenting the graphical user interface on a display screen of a computing device of the user in communication with the system over the communications network;

receiving, from the computing device of the user, a selection of a first selectable link of the respective selectable links, the first selectable link associated with a first date in the predetermined time period;

responsive to receiving the selection of the first selectable link, modifying the graphical user interface to include a list of one or more transactions, the list comprising a first transaction scheduled for the first date on the display screen of the computing device of the user; and providing, via the graphical user interface, an alert indicating that there are insufficient funds in the plurality of accounts of the first transaction, wherein the alert indicates a suggested allocation of the first transaction between a first account of the plurality of accounts and a second account of the plurality of accounts, and wherein the alert comprises a user interface component selectable by the user to accept the suggested allocation.

* * * * *

UNITED STATES PATENT AND TRADEMARK OFFICE
CERTIFICATE OF CORRECTION

PATENT NO.        : 10,636,087 B1
APPLICATION NO.   : 15/452344
DATED             : April 28, 2020
INVENTOR(S)       : Bardouille et al.

Page 1 of 1

It is certified that error appears in the above-identified patent and that said Letters Patent is hereby corrected as shown below:

In the Claims

In Column 13, Line 27, in Claim 1, before "respective", insert --to--

In Column 16, Line 3, in Claim 16, before "transactions,", insert --one or more--

Signed and Sealed this
Twenty-second Day of September, 2020

Andrei Iancu
*Director of the United States Patent and Trademark Office*